Patented June 6, 1950

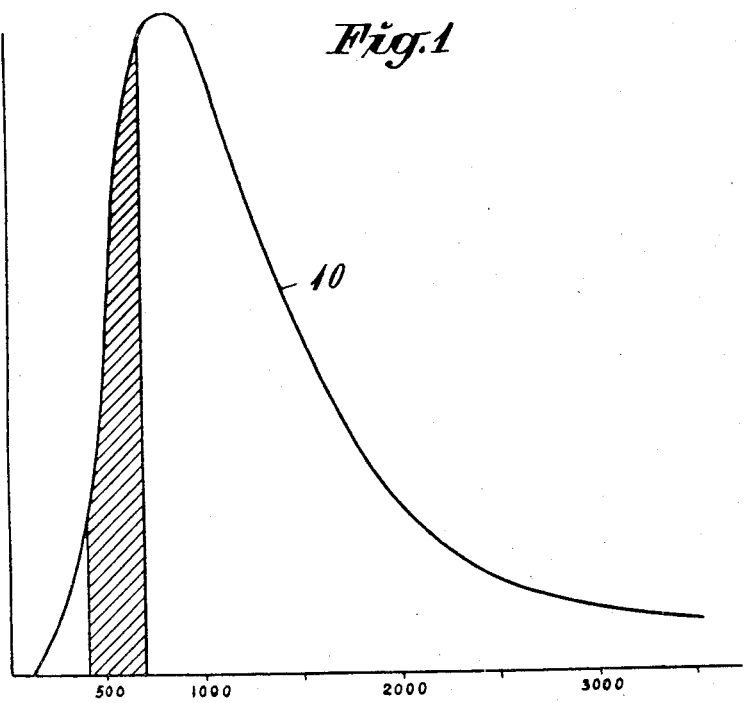
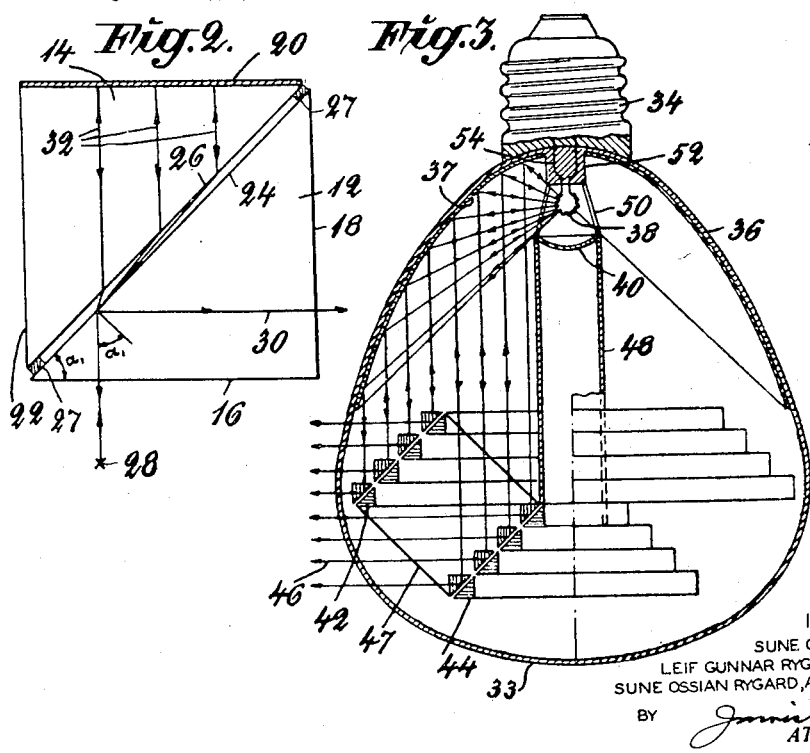

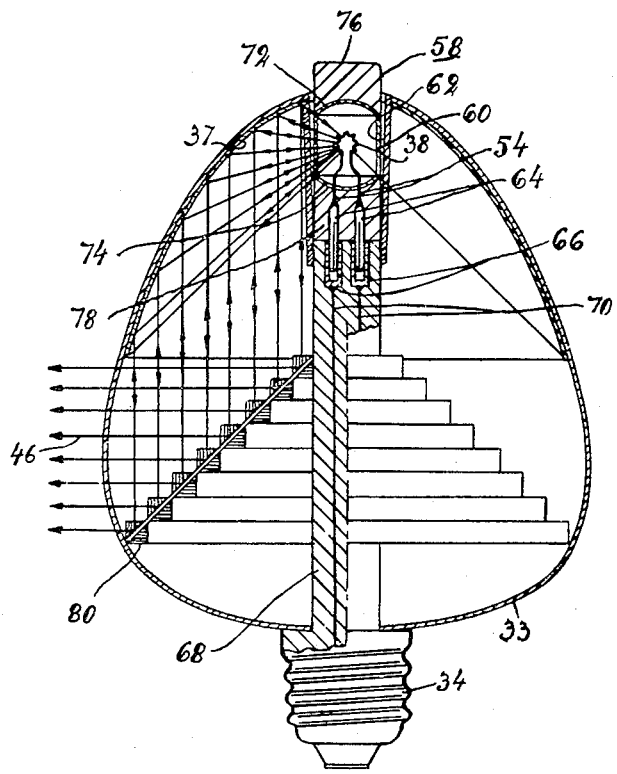

2,510,421

UNITED STATES PATENT OFFICE 2,510,421

EXTRACTING ENERGY WAVES OF CERTAIN LENGTH FROM A HEATED BODY

Sune Ossian Rygård, Stockholm, Sweden, and Leif Gunnar Rygård, deceased, late of Stockholm, Sweden, by Sune Ossian Rygård, administrator, Stockholm, Sweden Application July 21, 1945, Serial No. 606,359½
In Sweden July 21, 1944

8 Claims. (Cl. 176—34)

When a body is heated, it is caused to emit energy rays or waves of different wave lengths. Inasmuch as only energy waves of certain length are intended to be utilized in most cases, an energy radiation of all waves involves considerable drawbacks. To this end it has been suggested to disperse the energy waves and to reflect the waves of non-desired length back to the body. It is the main object of the invention to improve this known method so as to considerably increase the efficiency of said reflection, while the heat radiation resulting from the body is substantially confined to that portion of the energy waves being useful for the purpose aimed at.

Further objects and advantages of the invention will be apparent from the following description considered in connection with the accompanying drawing which forms a part of this specification, and of which:

Fig. 1 shows a diagram.

Fig. 2 is a side view of two prisms according to the invention.

Fig. 3 is a view, partially in section, of an electric lamp constructed in accordance with the invention.

Fig. 4 is a view, partially in section, of a lamp according to a further embodiment of the invention.

The curve 10 illustrated in Fig. 1 shows the distribution of the energy at the radiation of a black body at a temperature of 3000 degrees absolute, the abscissa indicating the wave length in $m\mu$ and the ordinate the energy in suitable unit. The hatched field between the abscissa and the curve 10 indicates the quantity of energy emitted in the form of visible radiation. This energy quantity constitutes, as will be seen from Fig. 1, only a small portion of the total energy radiation. Therefore an incandescent lamp having for its object to emit visible light has a very poor efficiency, inasmuch as the energy radiation falling outside the hatched field cannot be perceived by the eye. This holds true in particular for the infra-red energy rays.

The same drawback appears in other cases also, for instance, where ultraviolet rays are to be extracted, while at the same time visible light and infra-red rays, for example, are to be uselessly produced.

The device shown in Fig. 2 consists of two prisms 12, 14 from some material suited for the transmission of radiant energy, such as glass, silicate-crown-glass being preferred. The prism 12 and the prism 14 have sides 16, 18 and 20, 22, respectively, forming right angles between them.

The hypotenusal sides 24, 26 of the prisms are in parallel relationship and spaced apart a very small distance, preferably far below 1 millimeter. We prefer to secure the small spacing by placing a strip of a reflecting material, such as aluminum along the edges of the gap in question, said strip being only some thousandth of a millimeter in thickness. The two prisms may be replaced in an evacuated space. Also situated in this space is an incandescent body 28, from which energy waves are emitted against the pair of prisms, said waves meeting first with the side 16 of the prism 12 at right angles. The radiation energy from the body 28 is distributed over a series of wave lengths according to the above. Now, when the energy rays pass through the prism 12 and reach the side 24 thereof, they are caused to refract. Energy rays of smaller wave lengths will refract by a greater angle than energy waves of a greater wave length. Furthermore, in the refraction of energy rays of certain wave length, the following equation holds true:

$$\sin \alpha_1 = \frac{n_2}{n_1} \sin \alpha_2$$

$\alpha_1$ and $\alpha_2$ represent the angle between a perpendicular line to the bounding surface between two media and the incidenting and the salienting rays, respectively. $n_1$ and $n_2$ are the figures of refraction of the media. If the salient angle $\alpha_2$ is greater than 90°, there will be a reflection of the energy ray, so that in the present instance the ray will not leave the prism 12 through the surface 24.

The embodiment according to Fig. 2 is intended to be used for the extraction of visible rays. Now, the angle $\alpha_1$ between the sides 16 and 24 of the prism 12 is selected so that rays of a smaller wave length than 700 $m\mu$ being the upper limit for the visible wave field according to Fig 1, will be reflected against the side 24 of the prism 12 and continue out through the side 18 of the prism, as indicated at 30. On the other hand, all rays of a wave length greater than 700 $m\mu$ enter the gap between the prism sides 24, 26. These rays will then meet the surface 26 of the prism 14, and after refraction they penetrate into this prism. The rays 32 are spread in the prism 14 in correspondence to their wave length, but remain within the prism parallel to the rays emanating from the body 28. The surface 20 of the prism is mirrorcoated, so that the rays 32 will be reflected so as to pass the same way back to the body 28. A standing wave system with wave lengths greater than 700 $m\mu$ has thus been obtained between the body 28 and the reflecting surface 20. The standing wave system calls for a small energy only—a portion of the energy of certain wave lengths is absorbed by the glass and another portion by the reflecting surface 20. The energy thus lost is small, however, in comparison with the total energy.

According to the invention, the radiation energy emitted from the body 28 has been divided into two groups, the desired group being caused to leave the system, whereas the other group remains therein. The energy called upon to obtain a certain effect, such as candle power, will be considerably reduced according to the invention in comparison with the results hitherto obtained.

In the embodiment according to Fig. 3, reference character 33 designates the glass bulb of the lamp, the interior of which may be evacuated. At the socket 34 of the lamp, the bulb takes the form of a paraboloid 36, which is provided with a reflecting coating 37 on the inside thereof. An incandescent filament 38 is provided in or approximately in the focal point of the paraboloid. A spherical mirror 40 is arranged in front of the incandescent filament 38 and has for its object to shield that space angle within which the rays emitted from the incandescent filament 38 pass outside the parabolical mirror. Such rays are thus reflected back to the incandescent filament. The rays emitted from the filament 38 become parallel on having been reflected against the mirror 36. Inserted into the path of these parallel rays are a number of annular double prisms, which preferably are of the construction according to Fig. 2. In the present instance, the lamp has two groups 42, 44 of double prisms. Each group is of conical shape, the concentric gaps between the pairs of prisms being preferably aligned or in parallel with one another. The parallel rays from the mirror 36 are thus caught as far as possible by the double prisms, and the radiation escaping according to the arrows 46 from the individual prisms has a free passage. The prism groups 42, 44 may be interconnected, for instance by means of glass rods 47, while the inner group 44 is secured to a tube 48 carried by the spherical mirror 40. The latter is in turn suspended on glass rods 50, which may be secured in the glass body 52 having the electrical conducting wires 54 to the incandescent filament 38 moulded into the same.

In the embodiment according to Fig. 4, in which the same reference characters are used for equivalent parts as in the foregoing one, the incandescent filament 38 is provided within a separate member, generally designated by 58 and adapted to engage a sleeve 60 at one end of the lamp bulb 33. The member 58 comprises a glass bulb 62 hermetically enclosing the filament 38, which through conductors 54 is connected with contact pins 64. The pins 64 are adapted to engage corresponding contact sleeves 66 in a central cylindrical member 68 extending through the bulb 33 to the opposite end thereof and carrying the socket 34 of the lamp. In the member 68 which may be of any suitable electrically non-contacting material, conductors 70 are imbedded, which connect the sleeves 66 with the conductors of the socket 34 in known manner. The glass bulb 62 has two spherical mirror portions 72, 74 with reflecting coatings, so as to send the rays from the filament 78 meeting the same back to the filament. It will be seen that the axes of the mirror portions 72, 74 substantially coincide with the filament 38. The reflecting portions 72, 74 are placed laterally of the space angle through which the rays emitted from the filament 38 meet the parabolical reflector 37, said rays passing through the sleeve 60. On the external side of the reflectors 72, 74 members 76, 78 of any suitable material are secured, of which the one 76 extends outside the bulb 33 and the other one 78 carries the pins 64. The member 58 preferably is of cylindrical form.

In the embodiment according to Fig. 4 it is only necessary to replace the member 58 by a fresh one, when the filament 38 is burnt out. In the bulb 33 which preferably is hermetically closed and evacuated also in this case, a single row 80 of pairs of prisms is provided instead of two rows in the preceding embodiment.

The gap between the double prisms may contain any suitable medium, which may be solid, if desired, of a breaking number other than that of the prisms.

While two more or less specific embodiments of the invention have been shown, it is to be understood that this is for purpose of illustration only, and that the invention is not to be limited thereby, but its scope is to be determined by the appended claims.

What we claim is:

1. In a device of the class described, a heated element, means for directing energy waves emitted by said element to traverse parallel paths, a pair of prisms having corresponding faces in spaced parallel relationship, said prisms being located so that another face of one of said prisms is substantially normal to said parallel paths, and means providing a total reflecting surface at the opposite face of the other of said prisms.

2. In a device of the class described, a heated element, means for directing energy waves emitted by said element to traverse parallel paths, a pair of prisms each having a right angled triangular cross-section, the hypotenuse faces of said prisms being in spaced parallel relationship, said prisms being so located that another face of one of said prisms is substantially normal to said parallel paths, and means providing a total reflecting surface at the opposite face of the other of said prisms.

3. In a device of the class described, a heated element, means for directing energy waves emitted by said element to traverse parallel paths, a pair of concentric annular prisms each having a triangular cross-section, certain faces of said prisms being in spaced concentric parallel relationship, said prisms being so positioned that another face of one of said prisms is substantially normal to said parallel paths, and means providing a total reflecting surface at the face of the other of said prisms opposite said other face.

4. In a device of the class described, a heated element, means for directing energy waves emitted by said element to traverse parallel paths, a plurality of pairs of concentric annular prisms, such prisms having a triangular cross-section, certain faces of the prisms of each pair being in spaced concentric parallel relationship, the outer diameter of each pair of annular prisms being substantially equal to the inner diameter of the adjacent pair, said pairs being displaced axially so that the lower edges of one pair is in substantially the same plane as the upper edge of the next lower pair, said prisms being so positioned that another face of one prism of each pair is substantially normal to said parallel paths, and means providing a total reflecting surface at the face of the other prism of each pair opposite said other face.

5. In a device of the class described, a parabolic reflector, an incandescent element located at substantially the focal point of said reflector whereby energy waves emitted from said element are reflected in parallel paths, a pair of concentric annular prisms each having a triangular cross-section, certain faces of said prisms being in spaced concentric parallel relationship, said prisms being so positioned relative to said reflector that an other face of one of said prisms is substantially normal to said parallel paths, and means providing a total reflecting surface of the face of the other of said prisms opposite said other face.

6. In a device of the class described, a parabolic reflector, an incandescent element located at substantially the focal point of said reflector whereby energy waves emitted from said element are reflected in parallel paths, a spherical reflector so positioned with respect to said parabolic reflector and said element as to reflect back to the latter energy waves emitted therefrom which otherwise would pass out unreflected through the open end of the parabolic reflector, a pair of concentric annular prisms each having a triangular cross-section, certain faces of said prisms being in spaced concentric parallel relationship, said prisms being so positioned relative to said parabolic reflector that another face of one of said prisms is substantially normal to said parallel paths, and means providing a total reflecting surface at the face of the other of said prisms opposite said other face.

7. In a device of the class described, an enclosed transparent bulb, transparent means forming a cavity extending into said bulb and having an open outer end, an hermetically sealed transparent bulb removably disposed in said cavity, an incandescent element within said sealed bulb, a parabolic reflector carried by said enclosed bulb and so positioned that its focal point substantially coincides with said incandescent element whereby energy waves emitted by said element are reflected in substantially parallel paths, a pair of concentric annular prisms each having a triangular cross-section, certain faces of said prisms being in spaced concentric parallel relationship, said prisms being so positioned in said enclosed bulb that another face of one of said prisms is substantially normal to said parallel paths, and means providing a total reflecting surface at the face of the other of said prisms opposite said other face.

8. In a device of the class described a heated body, a member arranged in the neighborhood of this body and adapted to parallelize the energy waves emitted from said body over a relatively great space angle, an element which is pervious to said waves located in the path of these energy waves and having angularly extending faces so as to permit that the parallelized energy waves enter the element at right angles thereto but are not refracted and to reflect energy waves of the desired wave lengths against one face and permitting them to escape from the element through another face, while waves of other wave lengths leave the element at the first-mentioned face, and a second element which is pervious to said waves being spaced from said first-mentioned face and provided with a constant little gap to the first-mentioned element and being adapted to parallelize these waves and to convey them against a reflecting surface sending them back the same path to the first-mentioned element and thereby to the heated body.

SUNE OSSIAN RYGÅRD.
*Administrator of the estate of Leif Gunnar Rygård, Deceased.*

SUNE OSSIAN RYGÅRD.

REFERENCES CITED

The following references are of record in the file of this patent:

UNITED STATES PATENTS

| Number | Name | Date |
|---|---|---|
| 1,083,325 | Hoffman | Jan. 6, 1914 |
| 1,083,326 | Hoffman | Jan. 6, 1914 |
| 1,888,388 | Kral | Nov. 22, 1932 |
| 1,974,388 | Christmas | Sept. 18, 1934 |

FOREIGN PATENTS

| Number | Country | Date |
|---|---|---|
| 558,087 | France | May 16, 1923 |
| 758,347 | France | Nov. 3, 1933 |